June 26, 1973 — N. E. PONTECORVO — 3,741,773
PREPARATION OF RICOTTA CHEESE
Filed May 22, 1970
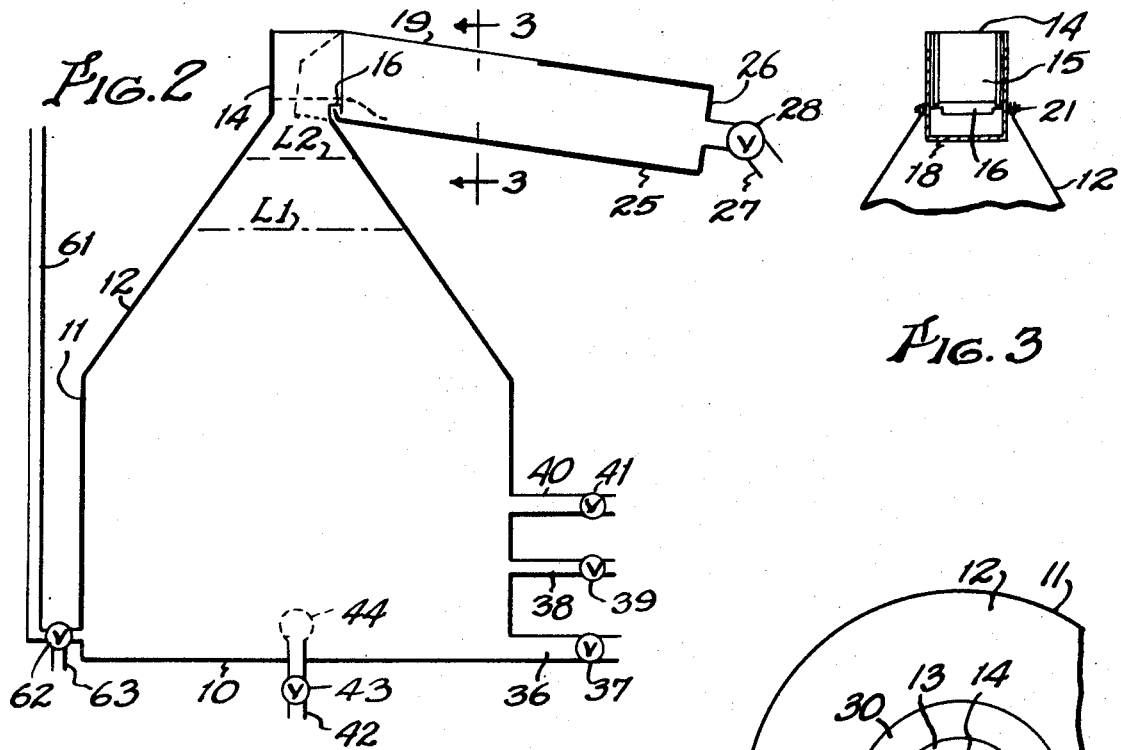
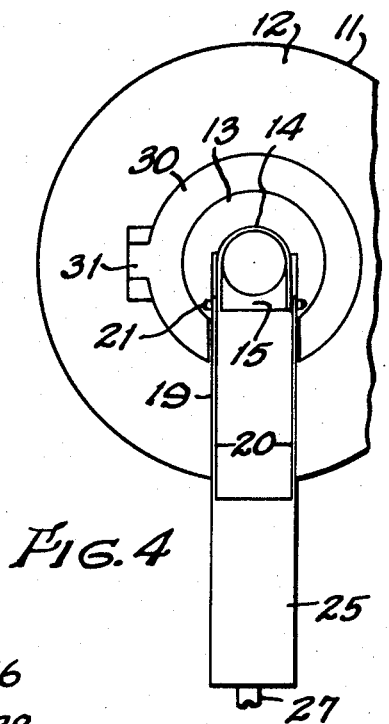
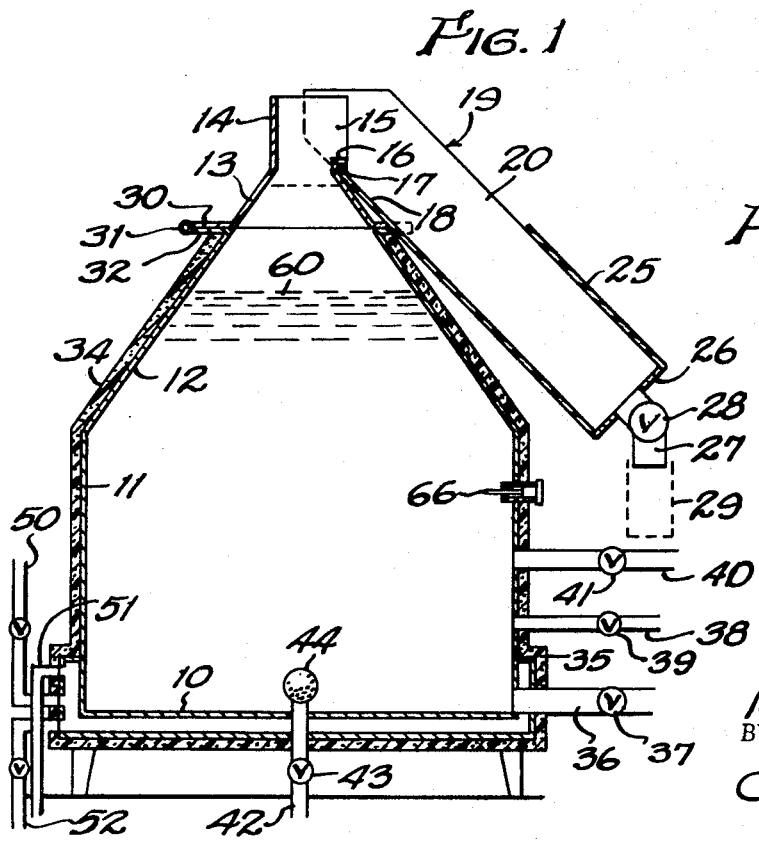
INVENTOR.
NICHOLAS PONTECORVO
BY
Lynn N. Latta
—ATTORNEY—

3,741,773
PREPARATION OF RICOTTA CHEESE
Nicholas E. Pontecorvo, Tarzana, Calif., assignor to Pontecorvo R & D Company, Los Angeles, Calif.
Filed May 22, 1970, Ser. No. 39,721
Int. Cl. A23c 19/02
U.S. Cl. 99—116      9 Claims

ABSTRACT OF THE DISCLOSURE

A flotation method of collecting ricotta cheese curd in a reduced neck at the top of a processing tank. Whey and milk are treated to form the curd which rises to the top of the body of liquid in the tank. Hot water is then injected into the bottom of the tank to elevate the body of liquid until the curd is skimmed off from the neck and delivered into a receptacle.

BACKGROUND OF THE INVENTION

In the existing practice of producing ricotta cheese, a mixture of whey (e.g. residue liquor from the processing of many types of cheeses and milk) are treated in a tub-like vat to develop the ricotta curd which rises to the top of the body of liquid and is then skimmed from the surface of the body of liquor in the vat by one or more workmen by hand ladling. There is a high degree of heat loss from the large surface area of the body of liquor. The hand ladling is slow and the labor cost is high.

SUMMARY OF THE INVENTION

In the method of this invention, the liquor is treated in a tank having a dome tapering upwardly to a discharge neck of restricted diameter. The liquor under treatment is at a level substantially below the neck. When the formation of curd (which rises and collects at the top of the body of liquor) is completed, hot water is injected into the bottom of the tank to elevate the body of liquor until the layer of curd at the top rises into the discharge neck, from which it is skimmed off by gravity flow through a discharge chute into a receiving hopper. From the hopper it is discharged into receptacles.

DESCRIPTION

The object of the invention is to provide a method and apparatus for processing ricotta cheese more expeditiously and economically than is possible with the existing method.

This and other objects will become apparent in the following specification and appended drawing, in which:

FIG. 1 is a vetrical axial sectional view of a processing tank illustrating the invention;

FIG. 2 is a schematic diagram of the tank;

FIG. 3 is a fragmentary cross-sectional view through the skimming chute, taken on line 3—3 of FIG. 2;

FIG. 4 is a fragmentary plan view of the tank.

Referring now to the drawing in detail, I have shown therein, as an example of one form of apparatus by which the invention may be practiced, a processing tank having a bottom 10, a cylindrical lower body 11, a conical dome 12 having a separable top section (manhole collar) 13, and a discharge neck 14 which is of U-section horizontally, having at one side a discharge vent 15. Vent 15 is defined above a straight horizontal overflow lip in the form of an inverted channel 16, which receives the inner end 17 of the bottom 18 of a skimming chute 19. Chute 19 includes bottom 18, a pair of lateral walls 20 the inner ends of which embrace the sides of neck 14 and are hinged thereto by pivot studs 21 which may be secured to the ends of channel 16 so that the chute 19 may be tilted vertically with end 17 pivoting in channel 16. From its outer end to a point intermediate its length, chute 19 is covered to provide a hopper 25. Communicating with the bottom 26 of hopper 25 is a discharge outlet (spout) 27 in which is a valve or cock 28 to open and shut the spout as required for controlling discharge into a suitable receptacle 29 which is preferable in the form of a perforated, strainer type of cup or pot from which residual moisture may drain.

The collar section 13 of the tank dome has a rim 30 which is hinged at 31 to a horizontal radial flange 32 on the dome 12 and is adapted to seat thereon with a suitable gasket (not shown) for sealing the dome sections 12 and 13 to one another, fluid-tight. Collar section 13 can be raised to give access to the interior of the tank by a workman for the purpose of cleaning and sterilizing it during a shut-down period.

The main body of the tank is provided with an enclosing coat (jacket) 34 of insulating material to minimize heat loss. Around the bottom of the tank is an insulated steam or hot water heating jacket 35 for maintaining the temperature of the body of liquor being processed in the tank.

Communicating with the tank at its bottom is a whey outlet 36 controlled by a valve or cock 37. Entering the tank through the side, at a level just about the jacket 35, is a whey and hot water inlet 38 controlled by a valve 39. A milk inlet 40, controlled by a valve 41, enters the tank through the side at an elevation above the inlet 38. A live steam inlet 42, controlled by a valve 43, enters the tank through the center of its bottom and is capped by a rosette 44 (perforated hollow sphere) for injecting live steam into the bottom of the treatment chamber defined within the tank. Rosette 44 is located closely adjacent the tank bottom.

Communicating with the heating jacket 35 are three plumbing lines, namely, a steam or hot water inlet 50 at an intermediate level, an overflow 51 at the top of the jacket enclosure, and a water outlet 52 at the bottom thereof. Lines 50 and 52 are controlled by respective valves.

A thermometer or thermistor 66, for reading the temperature of the liquor in the tank, is mounted in the side of the tank and projects into the treatment chamber. A sight gauge 61, connected to the bottom of the tank by a 3-way valve 62, is provided for visually determining the level of the liquor body inside the tank. A spout 63, communicating with the tank bottom through valve 62, can be utilized in lieu of outlet 36. Parts 61, 62, 63 are not shown in FIG. 1 because of lack of space adjoining that figure, but may be understood to be a part of the apparatus shown in FIG. 1.

In the practice of the method:

(1) The tank is filled with a body of whey 60 to the extent of somewhat less than a minimum of two thirds of its volume (where about one third of the volume of the treated liquor is milk, added later) up to somewhat less than 90% or 100% of its volume (where only 10% milk or no milk whatever is to be added).

The surface of the body of whey before adding milk may be at level L1 in FIG. 2.

(2) The whey is then heated by injecting live steam through inlet 42. The whey is heated to a temperature of 150° F. (Fahrenheit).

(3) Salt is added.

(4) Milk is then added to the body of liquor, being injected through inlet 40. The aggregate volume of whey and milk may reach to a level approximately as indicated at L2.

(5) The heating of the mixture is then continued until its temperature rises to a level in the range of 180° to 205° F.

(6) Vinegar or another suitable acid is then added to the liquor, being poured in through the top opening at the base of neck 14. This develops the fine cheese curd particles which gradually rise to the surface of the body of liquor, collecting in a layer just below neck 14.

(7) Steam inlet 42 is then closed, shutting off the flow of live steam into the liquor body, and hot water is injected into jacket 35, filling it. The hot water flow is then turned off and steam is injected into the belt of hot water in jacket 35, to maintain or slightly raise the temperature of the liquor body in the tank.

(8) The body of liquor is allowed to stand at the elevated temperature for about 5 minutes, to provide time for the finely divided curd particles to rise to the surface.

(9) Hot water or hot whey is then pumped into the lower area of the body of liquor through inlet 38 under careful control such as to avoid agitating the surface. The rising hot liquid sweeps the curd upward, and a layer of cheese particles is collected at the surface at an elevation slightly above the skimming lip 16 so that the layer of cheese, with a minimum percentage of entrained liquid, may be floated off into skimming chute 19 through discharge vent 15.

(10) Chute 19 is positioned nearly horizontal, at a very slight downward incline at the beginning of the skimming operation. This is to control the flow into the hopper 25 at a slow rate such as to avoid disintegration of the body of cheese which is very tender at this stage.

(11) As the skimming flow continues, the chute 19 is slowly and gradually lowered in order to fill the hopper 25 with the cheese mixture which retains flowability at this stage. The chute is lowered until it reaches a lower limit position (FIG. 1) as close to the side of dome 12 as possible.

(12) A perforated receptacle is then placed in communication with discharge spout 27, and valve 28 is opened to discharge the cheese mixture into the receptacle. Excess liquid is then allowed to drain from the body of cheese through the perforations in the receptacle. Succeeding receptacles are filled in this manner and the bodies of cheese therein are allowed to consolidate as the excess liquid is drained off.

(13) When all of the cheese has been drawn off the top of the body of liquor in the tank, the outlet 36 is opened and the residual liquor is drained from the tank. The tank is then washed and recharged for another processing cycle.

It is important that the liquid injected into the hot liquor for elevating its upper level to the skimming vent, be a heated liquid, preferably at or above the temperature of the liquor, in order to avoid chilling the liquor, which would inhibit the formation of curd.

I claim:

1. A method of processing ricotta cheese, comprising the following steps:
   (a) charging a treatment tank with a body of liquor composed at least largely of whey;
   (b) heating the liquor to a temperature in the range of 180°–205° F.;
   (c) adding an acid to develop fine cheese curd particles in the liquor;
   (d) allowing the liquor to stand at an elevated temperature while said curd particles rise and collect in a layer at the top of said liquor body;
   (e) injecting a liquid into the lower area of said liquor body under control such as to avoid agitation of the surface thereof, whereby to increase the volume of said liquor body so as to elevate the layer of collected cheese particles;
   (f) reducing the horizontal area of said layer of collected cheese particles and thereby increasing the depth of said layer while continuing to elevate it until it commences to overflow a vent at the top of said tank;
   (g) and gradually skimming off said layer from said liquor body through said vent into an elongated receptacle initially positioned nearly horizontally, the outer end of said receptacle being gradually lowered during said gradual skimming, while its other end is maintained in communication with said vent whereby to control the flow into said receptacle at a slow rate such as to avoid disintegration of the body of skimmed cheese particles, said body being collected in said receptacle.

2. The method defined in claim 1, including the step of adding a minor percentage of milk to the whey to constitute said body of liquor as a mixture of whey and milk.

3. The method defined in claim 2, wherein said minor percentage of milk is in a range up to 33½% of the total of said liquor body.

4. The method defined in claim 3, wherein said whey is heated to a temperature of about 150° F. prior to the addition of milk and the mixture of whey and milk is then heated to a temperature in the range of 180° to 205° F.

5. The method defined in claim 1, wherein said injected liquid is hot whey.

6. The method defined in claim 1, wherein the liquid injected for elevating said layer of curd particles is a hot liquid which will not chill said body of liquor.

7. The method defined in claim 1, wherein the skimmed-off curd is delivered from said vent into a chute having a receiving container at its end remote from said vent, and is collected in said container.

8. The method designed in claim 7, wherein said chute and container are gradually lowered from a nearly horizontal starting position to a depending position as said container is gradually filled with curd.

9. The method defined in claim 1, wherein said body of liquor is heated by injection of steam thereinto.

References Cited
UNITED STATES PATENTS

| | | | |
|---|---|---|---|
| 1,323,015 | 11/1919 | Clarel | 31—3 |
| 2,142,207 | 1/1939 | Price | 209—168 X |

OTHER REFERENCES

Kosikowski, F., Cheese and Fermented Milk Foods, Edwards Brothers, Inc., Ann Arbor, Mich., 1966 (p. 173), SF271.K6.

Sanders, G. P., Cheese Varieties and Descriptions, U.S. Dept. of Agri. Handbook No. 54, 1953 (pp. 105–106).

DAVID M. NAFF, Primary Examiner